United States Patent [19]
Calkin et al.

[11] 3,737,755
[45] June 5, 1973

[54] REGULATED DC TO DC CONVERTER WITH REGULATED CURRENT SOURCE DRIVING A NONREGULATED INVERTER

[75] Inventors: Edwin Theodore Calkin, Parsipanny; Billy Harold Hamilton, Summit; Frank Carl La Porta, Livingston, all of N.J.

[73] Assignee: Bell Telephone Laboratories Incorporated, Murray Hill, Berkeley Heights, N.J.

[22] Filed: Mar. 22, 1972

[21] Appl. No.: 236,889

[52] U.S. Cl. .......................... 321/2, 321/18, 321/21
[51] Int. Cl. .............................................. H02m 3/28
[58] Field of Search ........................... 321/2, 21, 18

[56] References Cited
UNITED STATES PATENTS

| | | | |
|---|---|---|---|
| 3,551,777 | 12/1970 | Bingley | 321/18 X |
| 3,473,039 | 10/1969 | Fegley | 321/2 X |
| 3,529,222 | 9/1970 | Gaitten et al. | 321/2 X |
| 3,611,108 | 10/1971 | Susumu et al. | 321/18 X |

*Primary Examiner*—William M. Shoop, Jr.
*Attorney*—R. J. Guenther and William L. Keefauver

[57] ABSTRACT

A regulated DC to DC converter comprises a switching-type regulated current source driving a non-regulated bridge-type inverter. The output signal of the converter is regulated by pulse width modulating the switching device in the switching regulator. The output impedance of the current source is inductive. This inductive impedance, which comprises the freewheeling or flyback inductor of the switching regulator, operates as the principal filter inductor of the converter. This regulator-inverter combination advantageously simplifies the switching control of the inverter switching devices and reduces the switching losses therein. It eliminates the switching control problems which normally occur due to switchthrough phenomena and the saturation of the inverter transformer.

9 Claims, 6 Drawing Figures

REGULATED DC TO DC CONVERTER WITH REGULATED CURRENT SOURCE DRIVING A NONREGULATED INVERTER

BACKGROUND OF THE INVENTION

This invention relates to regulated DC to DC converter circuits and more particularly to the regulation arrangement of the converter system to regulate a converted signal with a minimum of control circuitry. It is also specifically concerned with the improvement of the switching characteristics of the switching devices in the inverter circuit of the converter.

A typical converter source existing in the prior art, such as shown in FIG. 1, comprises a switching-type regulator 100 driving an inverter circuit 115. The rectified output of the inverter 115 is coupled to a load 160 to be energized. The regulator 100 includes a switching transistor 105 which intermittently conducts, thereby connecting the DC voltage source 101 to the inverter 115. The output signal at the load 160 is regulated by controlling the ratio of the conductive to nonconductive periods of the switching transistor 105. This duty cycle is controlled by the base drive control 112. The base drive control 112 may be completely external to the converter circuit or it may be part of a feedback control circuit responsive to a comparator circuit at the output of the converter. A comparator circuit compares the output signal with a reference signal and generates an error signal therefrom. Feedback circuits of this nature are well known in the art and need not be described in detail.

The output of the regulator 100 includes a flyback diode 106, a flyback inductor 107, and a filter capacitor 108. The flyback diode 106 and flyback inductor 107 provide for a continuous current flow during the nonconducting periods of the switching transistor 105. The capacitor 108 filters the output signal and applies a continuous voltage to the input of the inverter circuit 115.

The inverter circuit 115 is a bridge-type inverter with switching transistors 120, 125, 130 and 135 included in the four bridge arms. The switching transistors 120, 125, 130 and 135 of the inverter 115 are controlled by the switching control 150. Because these transistors tend to store charge while conducting, their turnoff response to switching control signals is delayed. Hence, it is possible that one or two of the transistors such as 120 or 135 could become conducting while the oppositely-phased transistors 130 and 125 are both still conducting due to their stored charge. This places a short circuit across the voltage of the capacitor 108 and may result in high currents flowing through the inverter switching transistors. This high current may damage the transistors or cause heat dissipation problems. To avoid this overlapping conduction, the switching control must include circuitry to delay the turnon of the switching transistors until the stored charge of each offgoing transistor is exhausted. The resulting sudden decrease in current in the windings of the inverter transformer 140 also causes very high spike voltages to appear across the collector-emitter terminals of the switching transistors 120, 125, 130 and 135. These voltages may cause one of the switching transistors 120, 125, 130 and 135 to fail causing a shutdown of the entire converter circuit.

The output transformer 140 of the inverter 115 is connected to a full wave rectifier 155 which in turn is coupled to the output load 160 via the filter 159. The inductor 161 of the filter 159 is fairly large in order to smooth the output current ripple.

The rectifying diodes in the rectifier 155 generate very high voltage spikes. The stored charge in the diodes permits the flow of reverse current at the instant of current reversal. This reverse current flow causes a large current spike to occur in the inverter switching transistors as they are turning on as is shown in FIG. 2. When the stored charge is exhausted and the diodes recover their blocking ability, the current flow halts abruptly. Due to the large inductance of the output filter inductor 161, a very large voltage spike is applied across the rectifier diodes which may equal a value several times the output voltage of the converter.

It is, therefore, an object of the invention to reduce the peak transient currents in the inverter switching transistors of a converter circuit.

It is another object of the invention to retard rapid changes in current flow and voltage levels in the switching and rectifying devices of a converter system.

It is yet another object of the invention to absorb within the converter any sudden changes in input or output voltages without impressing these changes upon the switching devices.

It is still another object of the invention to protect the converter circuit against sudden short circuits and open load conditions.

SUMMARY OF THE INVENTION

Therefore, in accord with the present invention, a nonregulated inverter is driven by a switching regulator current source. The switching regulator current source has its duty cycle controlled in order to regulate the converter output. The flyback inductor of the switching regulator current source is utilized as the main control element in the converter circuit. The regulated output current of the current source is applied directly to the inverter circuit with no intervening charge storage device. This advantageously permits the inverter to be operated in a nonregulated mode without the necessity of switching control circuitry to avoid switchthrough conditions. The peak collector currents of the switching transistors in the inverter are limited by the available current flowing through the flyback inductor of the switching regulator current source. The converter circuit includes charging networks to eliminate turnoff loss in the inverter switching devices and a clamping arrangement to prevent the voltage across the inverter switching devices from exceeding a critical breakdown voltage.

The converter circuit arrangement advantageously retards current increases in the inverter switching transistors during short-circuit or overload conditions. Any sudden changes in the input voltage or output voltage are absorbed by the flyback inductor. The flyback inductor constrains the current change to occur as a slowly changing linear ramp. This retardation of current changes permits switchthrough to occur in the switching devices of the inverter without danger of the switching devices themselves. This arrangement also advantageously permits the flyback inductor to function as the main filter inductor of the converter and it is advantageously located on the low voltage side of the converter.

BRIEF DESCRIPTION OF THE DRAWINGS

An understanding of the invention may be readily ascertained by reference to the following detailed description describing its operation and many additional advantages and features and by reference to the accompanying drawings in which.

DETAILED DESCRIPTION

Figure 3:
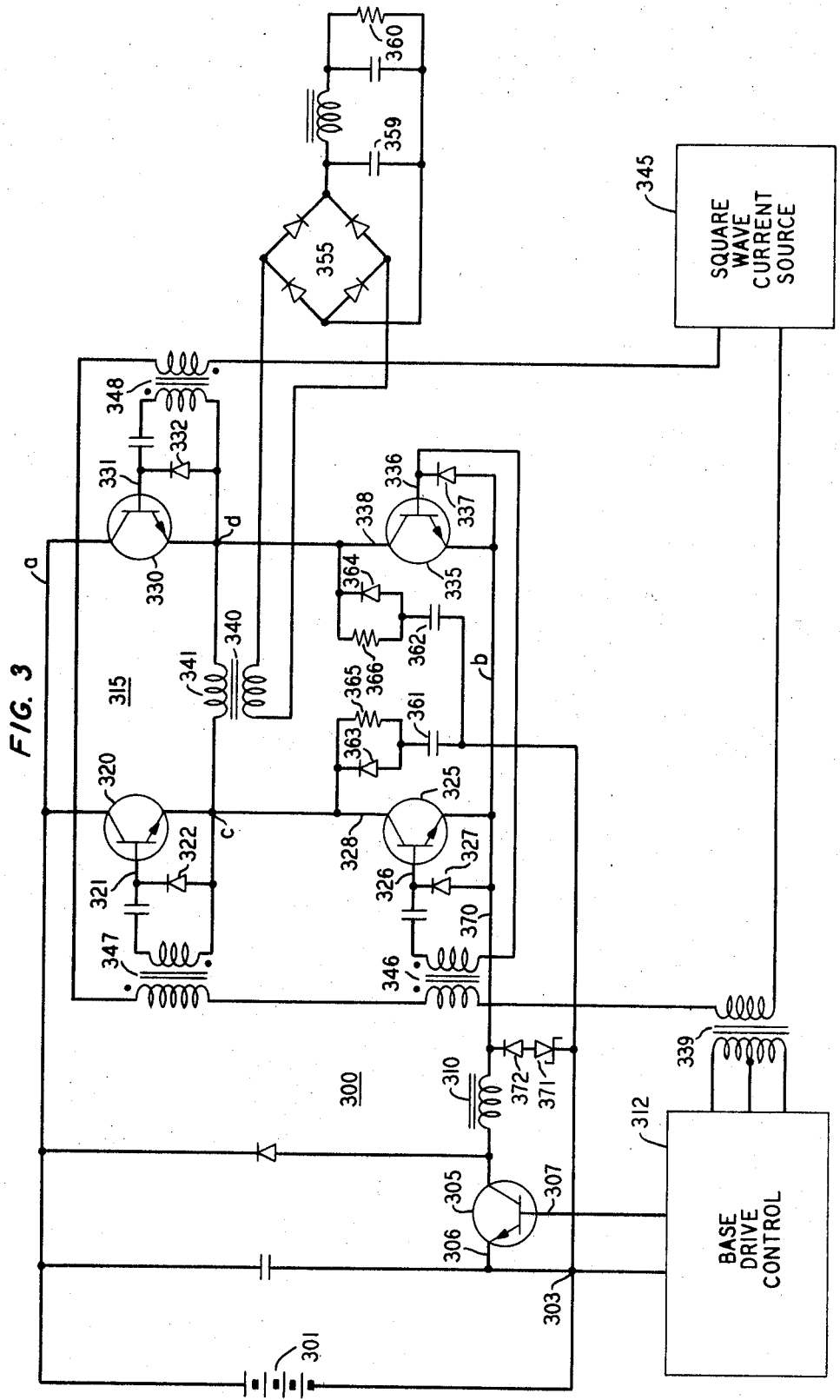
FIG. 3 is a schematic of a DC to DC converter utilizing regulation circuitry and having protection features according to the principles of the invention.

The converter circuit, shown in FIG. 3, comprises a switching type regulated current source 300 driving a nonregulated inverter 315. The switching regulator 300 is pulse width modulated to supply a constant current at its output lead 370. This constant current is applied to the nonregulated inverter circuit 315. The output of the inverter 315 is applied, via transformer 340, to an output rectifier 355. The rectified signal is coupled, via the filter 359, to the output load 360 to be energized.

The switching regulator 300 supplies a regulated current to the input of the inverter 315. The current level for a given load and input voltage is a direct function of the duty cycle of the switching transistor 305. The switching of the transistor 305 intermittently couples the voltage source 301 to the inverter circuit 315. The switching of the transistor 305 is controlled by a pulse width modulated base drive control 312 which is operated in phase with the square wave current source 345 described below. The base drive control 312 may be controlled by an internal feedback arrangement or by an external drive circuit arrangement. Such arrangements are well known in the art and need not be discussed herein in detail.

The flyback inductor 310 is directly connected via lead 370, to the input of the inverter 315. This direct connection advantageously permits the switching devices of the inverter to be operated without regard to switchthrough and hence simplifies the switching control thereof. These advantages are described hereinbelow in detail.

The pulse width modulated base drive control 312 has its output coupled to the base 307 and emitter 306 of the switching transistor 305. The base drive control 312 rectifies and modulates the signal output of the square wave current source 345 and utlizes it as the base drive signal for the switching transistor 305. The output of the square wave current source 345 is coupled to the base drive control 312 via the transformer 339.

The square wave current source 345 is also utilized to drive the switching transistors in the inverter 315 into alternate conducting and nonconducting modes. By utilizing a single square wave current source to supply the driving signal for both the switching regulator 300 and the inverter circuit 315, the switching of the switching devices occur in a fixed phase relation with each other.

The inverter circuit 315 comprises four switching transistors, 320, 325, 330 and 335, which are connected in a bridge configuration. The output of the switching regulator is applied to the opposing terminals $a$ and $b$ of the bridge configuration. The inverter transformer 340 is connected to the other two oposing terminals c and d of the bridge. The two pairs of the switching transistors 320,335 and 325,330 of the inverter 315 are alternately driven into conduction by the signal output of the square wave current source 345 and are operated in an unmodulated mode. The output of the square wave current source 345 is coupled to the input base electrodes of the inverter switching transistors 320, 325, 330, and 335 via the transformers 346, 347 and 348 which couple the square wave signals to the base electrodes 321, 326, 331 and 336 of the inverter switching transistors 320, 325, 330 and 335, respectively.

The inverter bridge operates so that the transistors in the opposing arms of the bridge network are conducting or nonconducting. The operation of the bridge inverter may be best explained by describing its actual sequence of switching. Assume initially that the transistors 320 and 335 are conducting and that the transistors 325 and 330 are nonconducting. As the square wave current source output signal makes a polarity transition, the polarity of the current applied, via the transformers 346, 347 and 348 to the base electrodes of the transistors 320, 325, 330 and 335, reverses. The transistors 325 and 330 are biased into their conducting condition. A turnoff signal is applied to the transistors 320 and 325. However, these transistors, at the moment, remain conducting due to the stored charge that they contain. Due to this stored charge, the conducting transistors of the inverter bridge continue conduction after the nonconducting transistors have been biased into conduction. Since at this moment all four transistors are conducting, the voltage across the primary winding 341 of the inverter transformer 340 collapses to a zero value. The voltage across the inverter transformer primary 341 remains collapsed for a short period of time and the current therein rapidly decays to zero.

The current flowing through the short circuit created by the simultaneous conduction of transistors 320 and 325 and by transistors 330 and 335 is limited by the current flowing through the flyback inductor 310. The output current of the flyback inductor 310 is divided between the two arms of the inverter bridge between nodes $a$ and $b$. Eventually upon exhaustion of the stored charge the inverter switching transistors 320 and 335 are biased into their nonconducting state. This reestablishes the input voltage across the primary winding 341 of the inverter transformer 340.

The current source driven inverter configuration, in addition to limiting short circuit currents, advantageously reduces the switching losses in the switching transistors of the inverter 315 during turnon thereof. The leakage inductance of the inverter transformer 340 in combination with the flyback inductance of the flyback inductor 310 is sufficient to collapse the voltage across the collector-emitter path of the switching transistors being turned on in the inverter 315. The current source driven inverter generates an induced reverse voltage which counterbalances the source voltage and eliminates the votlage drop across the collector-emitter path of the transistor during turnon. Hence, the turnon of the inverter switching transistors 320, 325, 330 and 335 occurs without the dissipation of considerable power in the transistors being turned on.

Figure 1:
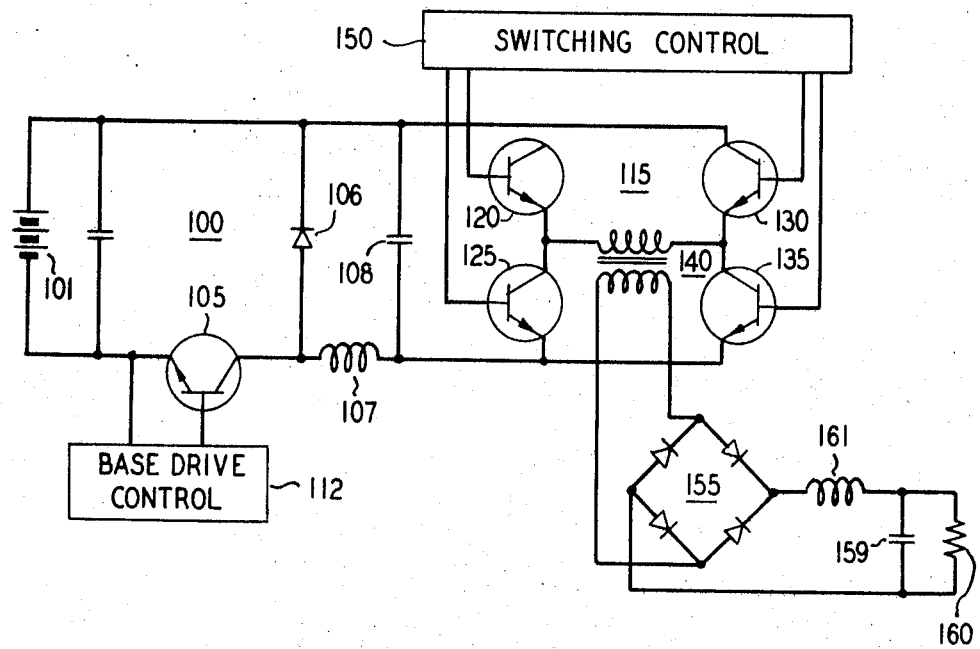
FIG. 1 is a schematic of a typical DC to DC converter according to the prior art and described hereinabove.
Figure 2:
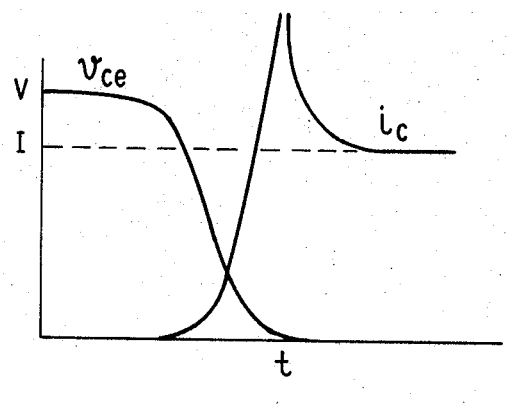
FIG. 2 is a switching waveform diagram to assist in explaining the switching characteristics of the converter in FIG. 1.
Figure 4A:
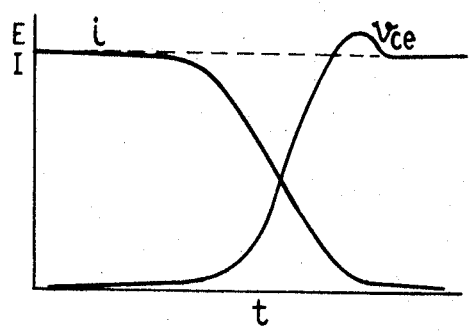
FIGS. 4A and 4B are switching waveform diagrams to assist in explaining the switching characteristics of the converter in FIG. 3.
Figure 4B:
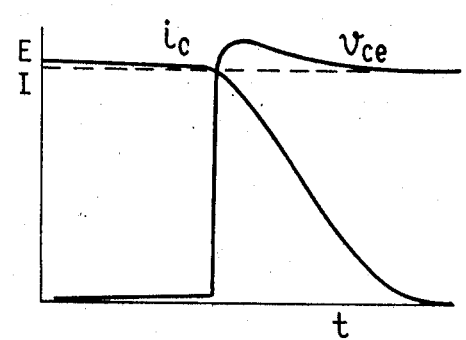

The turnoff losses of the inverter switching transistors 320, 325, 330 and 335 are greatly reduced by the inclusion of special turnoff loss reduction networks connected to the nodes c and d of the bridge. In the absence of this loss reduction network, a voltage in excess of that of the input source may be applied across the collector-emitter path of the inverter switching transistors at the instant the collector current begins to decrease from the saturated value flowing through teh saturated transistor. This is due to stored energy in the flyback inductor 310 and to the presence of leakage inductance in the primary winding 341 of inverter transformer 340. The primary winding 341 of the inverter transformer 340 is conducting no current at the instant the collector current begins to decrease from this saturated value, since all the opposing switching transistors of the inverter are now conducting having been biased into conduction. The leakage inductance of the inverter transformer 340 is coupled in series with the inductance of the flyback inductor 310 when the current in the transistor being turned off begins to decrease. The flyback inductor 310 conducts a substantially constant current. Due to this constant current in the flyback inductor 310 the current decrease in the inverter switching transistor being turned off must be matched by corresponding current increase in the inverter switching transistor turning on. This current flows through the primary winding 341 of the inverter transformer 340. The voltage drops occurring at this moment across the winding 341, the flyback inductor 310, and the source voltage 301 may impress a combined voltage across the collector-emitter path of the off-going switching transistor of the inverter, which substantially exceeds the voltage supplied by the input voltage source 301. This voltage, which suddenly appears at the moment the transistor current begins to decrease in combination with the current flow through the off-going switching transistor, causes a significant power loss therein which may overstress the transistor, as shown in FIG. 4B.

The turnoff loss reduction networks comprise capacitive energy storage devices which discharge at the moment of turnoff to nullify the large generated inductance voltage described above. The turnoff loss reduction network connected to the inverter switching transistor 325 comprises a series-connected capacitor 362 and diode 363. This series connection connects the terminal 303 of the input voltage source 301 to the collector 328 of the transistor 325. A charging resistor 365 shunts the diode 363. A similar turnoff loss reduction network is symmetrically connected to the switching transistor 335 and comprises the capacitor 362 and diode 364. This network connects terminal 303 to the collector 338 and includes a charging resistor 366 which shunts the diode 364.

The principles of the turnoff loss reduction networks may be best explained by describing the operation of the network attached to collector 328 of transistor 325. Assume that the transistors 325 and 330 are conducting after just having been turned on. The transistor 335 has just been turned off. The transistor 320 is still conducting due to its stored charge but is about to turn off. The capacitor 361 is charged to a voltage equaling the input voltage supplied by the input voltage source 301. As the current in the transistor 320 decreases, it must be matched by an increasing current flowing through the transistor 330 and the primary winding 341 into the transistor 325, because the flyback inductor 310 maintains a substantilly constant current. The inductance of the primary winding 341, however, limits the current rise therein. The added current to maintain the constant current through the flyback inductor 310 is supplied by the discharge current of the capacitor 361. The capacitor 361 discharges a current into the collector 328 through the transistor 325 and into the flyback inductor 310. The discharge current it supplies is equal to the current decrease in the transistor 320 as it turns off less the current increase in the primary winding 341 of transformer 340. The voltage drop across the capacitor 361 decreases as the capacitor discharges. As the capacitor 361 discharges the curent flow into the inverter transformer primary 341 gradually increases and by the time the transistor 320 stops conducting, all of the flyback inductor current is supplied by current flowing from the discharging capacitor 361 and through the primary winding 341. Eventually the entire current is supplied, via the primary winding 341 and the current from capacitor 361 ceases.

As the capacitor 361 supplies the difference current between the flyback inductor 310 and the transformer primary 341, it may completely discharge and charge in an opposite direction thereby increasing the voltage across the collector-emitter path of transistors 320 and 335 higher than the voltage supplied by the source 301. A limit is placed on this excess voltage by a clamping arrangement comprising the series-connected diode 372 and breakdown diode 371. The required flyback inductor current at this point is supplied through the diodes 371 and 372 until conduction through the primary winding 341 reaches a current level sufficient to supply this demand. The diodes 322, 327, 332 and 337 are connected across the base emitter junctions of the inverter switching transistors 320, 325, 330 and 335, respectively, to limit the reverse voltage occurring thereacross when turnoff signals are applied.

As is apparent from the above description, the loss reduction network advantageously retards the increase in the collector-emitter voltage across the inverter switching transistor as it turns off. This voltage increase is retarded by discharging current from a storage capacitor into the collector of the switching transistor during turnoff. Hence, power dissipation in the switching transistor during turnoff is greatly reduced. This becomes readily apparent upon inspection of the waveform diagram shown in FIG. 4A wherein it is apparent that the collector emitter voltage increases gradually as the current flow decreases in the inverter switching transistor.

Figure 5:
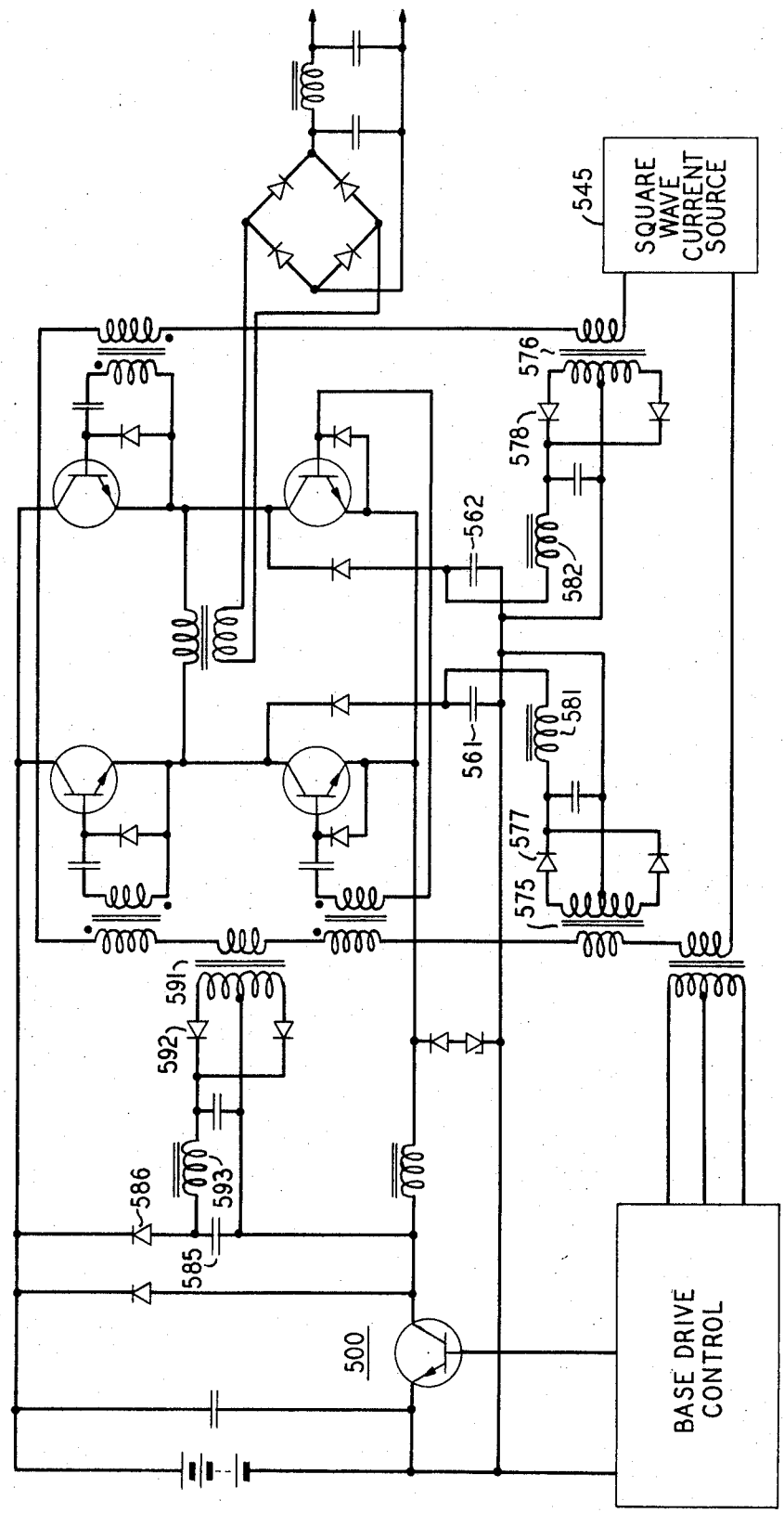
FIG. 5 is a schematic of a DC to DC converter including special loss reduction circuitry to improve the converter operating efficiency.

The converter circuit shown in FIG. 5 includes low loss charging arrangements to reduce the losses occurring within the loss reduction network included in the converter circuit shown in FIG. 3. Since the converter circuit operates identically to the converter shown in FIG. 3, it is not believed necessary to describe its operation in detail. The circuitry of FIG. 5 represents a particular illustrative embodiment of a converter of very high efficiency.

The capacitors 561 and 562 which reduce the turnon losses in the inverter switching transistor are charged by the current output of the square wave current source 545 instead of through resistors 365 and 366 from the input voltage source as shown in FIG. 3. The output of the current source 545 is coupled, via transformers 575 and 576, to the full wave rectifiers 577 and 578, respectively. The regulated current is filtered to reduce the peak power required from the current source by the filters 581 and 582, respectively, and applied from thence to charge the capacitors 561 and 562. The low loss charging networks apply a steady state charging current to the capacitors 561 and 562 with low dissipative loss.

The switching regulator 500 includes a turnoff loss reduction network including the capacitor 585 and the diode 586. A description of this turnoff loss reduction network may be found in our copending application Ser. No. 286,833 filed Mar. 22, 1972 and assigned to the same assignee. The capacitor 585 is charged with low loss by the square wave source 545. The square wave source 545 is coupled to the transformer 591 which in turn is coupled to the rectifier 592. The output of rectifier 592 is coupled by the filter 593 to the capacitor 585.

What is claimed is:

1. A converter circuit comprising, an inverter circuit including at least a switching device, a regulated current source to supply signal energy to said inverter circuit, said current source including a switching regulator having an inductive output impedance and clamping means to limit the voltage output of said regulator at less than some specified voltage limit, said inductive output impedance including an inductor which serves as a sole current source path between said regulator and said inverter if the voltage output of said regulator is less than said specified voltage.

2. A converter circuit as defined in claim 1 wherein said inverter circuit includes four switching devices connected in a bridge configuration and two turnoff loss reduction networks connected to opposite bridge arm junctions, each turnoff loss reduction network comprising a series connected diode and capacitor connecting respective ones of said bridge arm junctions to said input terminals, and a resistor shunting said diode.

3. A converter circuit as defined in claim 1 wherein said inverter circuit includes four switching devices connected in a bridge configuration and two turnoff loss reduction networks connected to opposite bridge arm junctions and each including a series connected diode and capacitor, a square wave current source to drive said switching devices, and means to utilize said square wave current source to charge said capacitors including a series connected transformer, rectifier and filter to couple said square wave current source to said capacitor.

4. A converter circuit comprising a switching regulator having a switching device and an inductive output impedance including a flyback inductor, a source of voltage to drive said switching regulator, means to pulse width modulate said switching device to regulate the current output of said switching regulator, an unregulated inverter circuit having switching devices including driving means to switch said switching devices at a constant duty cycle, said inductive output impedance connected directly to the input of said inverter circuit, a series connected unidirectional conducting device and oppositely poled voltage breakdown device connecting the junction of said switching regulator and said inverter input with said source of voltage.

5. A converter circuit as defined in claim 4 wherein said inverter compirses four of said switching devices connected in a bridge configuration, and means to reduce turn off losses in the switching devices including capacitive energy storage devices, connected to the opposite junctions of opposite pairs of said switching devices.

6. A converter circuit as defined in claim 5 wherein said means to reduce turnoff losses include charging means to charge said capacitive energy storage devices including means to couple said capacitive energy storage devices to said source of voltage.

7. A converter circuit as defined in claim 5 wherein said means to reduce turnoff losses includes charging means to charge said capacitive energy storage devices including means to derive a charging current from said driving means to switch said switching devices comprising a series connected transformer, rectifier and filter coupling said driving means to said capacitive energy storage devices.

8. A converter circuit as defined in claim 5 wherein said switching devices comprise switching transistors including base emitter junctions and diodes respectively shunting each of said base emitter junctions and poled in an opposite current direction to the current direction of said base emitter junctions.

9. A converter circuit as defined in claim 5 wherein said switching regulator includes a loss reduction network including a regulator connected capacitive energy storage device, means to charge said regulator connected capacitive energy storage device including means to derive a charging current from said driving means to switch said switching devices.

* * * * *